(12) United States Patent
Morita

(10) Patent No.: US 9,528,386 B2
(45) Date of Patent: Dec. 27, 2016

(54) NOZZLE BLADE

(75) Inventor: Isao Morita, Tokyo (JP)

(73) Assignee: IHI CORPORATION (JP)

( * ) Notice: Subject to any disclaimer, the term of this patent is extended or adjusted under 35 U.S.C. 154(b) by 497 days.

(21) Appl. No.: 14/116,462

(22) PCT Filed: May 24, 2012

(86) PCT No.: PCT/JP2012/063385
§ 371 (c)(1),
(2), (4) Date: Nov. 8, 2013

(87) PCT Pub. No.: WO2012/161280
PCT Pub. Date: Nov. 29, 2012

(65) Prior Publication Data
US 2014/0112764 A1 Apr. 24, 2014

(30) Foreign Application Priority Data
May 26, 2011 (JP) ................ 2011-118104

(51) Int. Cl.
*F01D 17/16* (2006.01)
*F01D 5/14* (2006.01)
*F01D 9/04* (2006.01)
*F02B 37/24* (2006.01)
*F02C 6/12* (2006.01)

(52) U.S. Cl.
CPC ........... *F01D 17/16* (2013.01); *F01D 5/141* (2013.01); *F01D 9/045* (2013.01); *F01D 17/165* (2013.01); *F02B 37/24* (2013.01); *F02C 6/12* (2013.01); *F05D 2220/40* (2013.01); *F05D 2240/121* (2013.01); *Y02T 10/144* (2013.01)

(58) Field of Classification Search
None
See application file for complete search history.

(56) References Cited

U.S. PATENT DOCUMENTS

| 4,172,361 A | 10/1979 | Kronogard ............. 60/39.16 |
| 7,255,530 B2 | 8/2007 | Vogiatzis et al. ......... 415/159 |

(Continued)

FOREIGN PATENT DOCUMENTS

| CN | 101103178 A | 1/2008 | |
| DE | EP 1873402 A1 * | 1/2008 | ........... F04D 29/444 |

(Continued)

OTHER PUBLICATIONS

European Search Report, dated Feb. 20, 2015, issued in corresponding European Patent Application No. 12789256.0. Total 7 pages.

(Continued)

*Primary Examiner* — Igor Kershteyn
*Assistant Examiner* — Justin Seabe
(74) *Attorney, Agent, or Firm* — Ostrolenk Faber LLP

(57) ABSTRACT

This relates to a nozzle blade in which the leading edge shape has a curved-line shape that is formed by the distance from the rotation axis of the nozzle blade to the leading edge changing depending on the nozzle blade height position, and the trailing edge shape has a straight-line shape that is formed by the distance from the rotation axis of the nozzle blade to the trailing edge being constant irrespective of the nozzle blade height position.

3 Claims, 10 Drawing Sheets

(56) References Cited

U.S. PATENT DOCUMENTS

| | | | |
|---|---|---|---|
| 7,509,804 B2* | 3/2009 | Kobayashi | F01D 17/165 415/158 |
| 2004/0223840 A1 | 11/2004 | Vogiatzis et al. | 415/1 |
| 2005/0220616 A1 | 10/2005 | Vogiatzis et al. | |
| 2010/0284801 A1 | 11/2010 | Greim et al. | |

FOREIGN PATENT DOCUMENTS

| | | |
|---|---|---|
| DE | 10 2009 012 132 A | 9/2010 |
| EP | 2476862 A1 | 7/2012 |
| JP | 62-138834 | 9/1987 |
| JP | 11-257082 | 9/1999 |
| JP | 2000-018004 | 1/2000 |

OTHER PUBLICATIONS

International Search Report mailed Aug. 21, 2012 in corresponding PCT International Application No. PCT/JP2012/063385.

Chinese Office Action and Search Report dated Sep. 30, 2014 in corresponding Chinese Patent Application No. 201280024831.1 (9 pages).

Korean Notice of Non-Final Rejection dated Oct. 29, 2014 in corresponding Korean Patent Application No. 10-2013-7031207 (6 pages).

* cited by examiner

NOZZLE BLADE

CROSS-REFERENCE TO RELATED APPLICATIONS

The present application is a 35 U.S.C. §§371national phase conversion of PCT/JP2012/063385, filed May 24, 2012, which claims priority to Japanese Patent Application No. 2011-118104, filed May 26, 2011, the contents of which are incorporated herein by reference. The PCT International Application was published in the Japanese language.

TECHNICAL FIELD

The present invention relates to a nozzle blade.

BACKGROUND ART

In a variable-capacity turbocharger, a nozzle blade is annularly arranged in a plurality in the periphery of a turbine impeller, and the capacity of the turbine is changed by adjusting the nozzle opening by the rotation angle of these nozzle blades.

It is known that when the shape of the nozzle blades that are arranged on the periphery of this kind of turbine impeller is changed, the flow of exhaust gas that is supplied to the turbine impeller changes in conjunction with shape changes of the nozzle blades, and the turbine efficiency changes.

For example, Patent Document 1 discloses a nozzle blade in which the leading edge shape and the trailing edge shape are curved in the blade height direction (rotation axis direction).

In greater detail, in Patent Document 1, the leading edge shape and the trailing edge shape of the nozzle blade are set so as to curve so that the center in the blade height direction is concave toward the rotation axis side. Accordingly, the turbine efficiency increases.

PRIOR ART DOCUMENTS

Patent Documents

[Patent Document 1] U.S. Pat. No. 7,255,530

DISCLOSURE OF INVENTION

Problems to be Solved by the Invention

However, a nozzle blade is sought in which turbine efficiency is obtained that is higher than the nozzle blade disclosed in Patent Document 1.

Moreover, in the case of power no longer being transmitted to the nozzle blades for whatever reason, in order to prevent the blocking up of exhaust gas in the turbine, it is preferable for the nozzle to rotate so that the opening of the nozzle increases. However, in the nozzle blade that is disclosed in Patent Document 1, the aforementioned problem is not considered. For this reason, a nozzle blade is sought that improves the turbine efficiency and moreover in which the direction of the torque received from the exhaust gas always becomes the direction in which the nozzle opening increases.

The present invention was achieved in view of the problems given above, and has as its object to provide a nozzle blade that is capable of improving the turbine efficiency more than the nozzle blade disclosed in Patent Document 1, and provide a nozzle blade that improves the turbine efficiency and moreover always receives the torque in the direction in which the nozzle opening increases.

Means for Solving the Problems

The present invention adopts the following constitution as a means for solving the aforementioned issues.

The first aspect according to the present invention is a nozzle blade that is disposed in a plurality in a rotatable manner at the periphery of a turbine impeller that a variable-capacity turbocharger is provided with, in which the leading edge shape in the nozzle blade height direction has a curved-line shape that is formed by the distance from the rotation axis of the nozzle blade to the leading edge changing depending on the nozzle blade height position, and the trailing edge shape in the nozzle blade height direction has a straight-line shape that is formed by the distance from the rotation axis of the nozzle blade to the trailing edge being constant irrespective of the nozzle blade height position.

The second aspect according to the present invention adopts in the aforementioned first aspect a constitution of the nozzle blades being disposed in a nozzle that is formed by being sandwiched by a shroud that surrounds the tip side of the turbine blades that the turbine impeller has and an opposing wall that is separated from the shroud in the nozzle blade height direction to be oppositely disposed, and a region in which the distance from the rotation axis to the leading edge is shortest existing in a region sandwiched by both ends in the nozzle blade height direction.

The third aspect according to the present invention adopts in the aforementioned second aspect a constitution of the region in the nozzle blade height direction in which the distance from the rotation axis to the leading edge is shortest being disposed more to the opposing wall side rather than the center in the nozzle blade height direction.

Effects of the Invention

In the nozzle blade of the present invention, the leading edge shape in the nozzle blade height direction has a curved-line shape that is formed by the distance from the rotation axis of the nozzle blade to the leading edge changing depending on the nozzle blade height position, and the trailing edge shape in the nozzle blade height direction has a straight-line shape that is formed by the distance from the rotation axis of the nozzle blade to the trailing edge being constant irrespective of the nozzle blade height position.

In this case, it is possible to improve the turbine efficiency more than a nozzle blade in which both the leading edge shape in the nozzle blade height direction and the trailing edge shape in the nozzle blade height direction have curved-line shapes.

Also, in the nozzle blade of the present invention, a region in which the distance from the rotation axis to the leading edge is shortest exists in a region that is sandwiched by both ends in the nozzle blade height direction, and the region in which the distance from the rotation axis to the leading edge is shortest is arranged more to the opposing wall side than the center in the nozzle blade height direction.

In this case, it is possible to improve the turbine efficiency, and moreover it is always possible to receive the torque in the direction in which the nozzle opening increases.

BEST MODE FOR CARRYING OUT THE INVENTION

Figure 1:
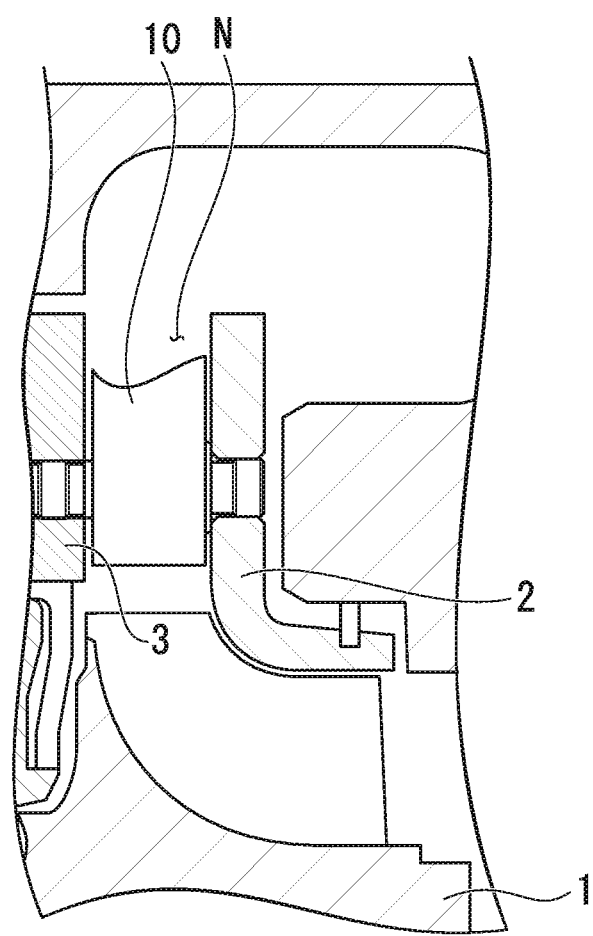
FIG. 1 is an enlarged cross-sectional view of the essential portions of a turbocharger in which the nozzle blade in one embodiment of the present invention is installed.

Hereinbelow, one embodiment of the nozzle blade according to the present invention shall be described, referring to the drawings. Note that in the following drawings, the scale of each member is suitably altered in order to make each member a recognizable size.

FIG. 1 is an enlarged cross-sectional view of the essential portions of a turbocharger including a nozzle blade 10 of the present embodiment.

As shown in FIG. 1, the turbocharger is provided with a turbine impeller 1 that is rotatively driven by receiving exhaust gas. At the upstream side of the turbine impeller 1 is formed a nozzle N that is formed by a shroud 2 that surrounds the tip side of the turbine blades that the turbine impeller 1 has and a hub 3 (opposing wall) that is separated from the shroud 2 in the direction of the height of the nozzle blade 10 (nozzle blade height) to be oppositely disposed.

The nozzle N is provided so as to surround the entire circumference of the turbine impeller 1. By the supply of exhaust gas from the nozzle N to the turbine impeller 1, the exhaust gas is supplied over the entire circumference of the turbine impeller 1.

Figure 2A:
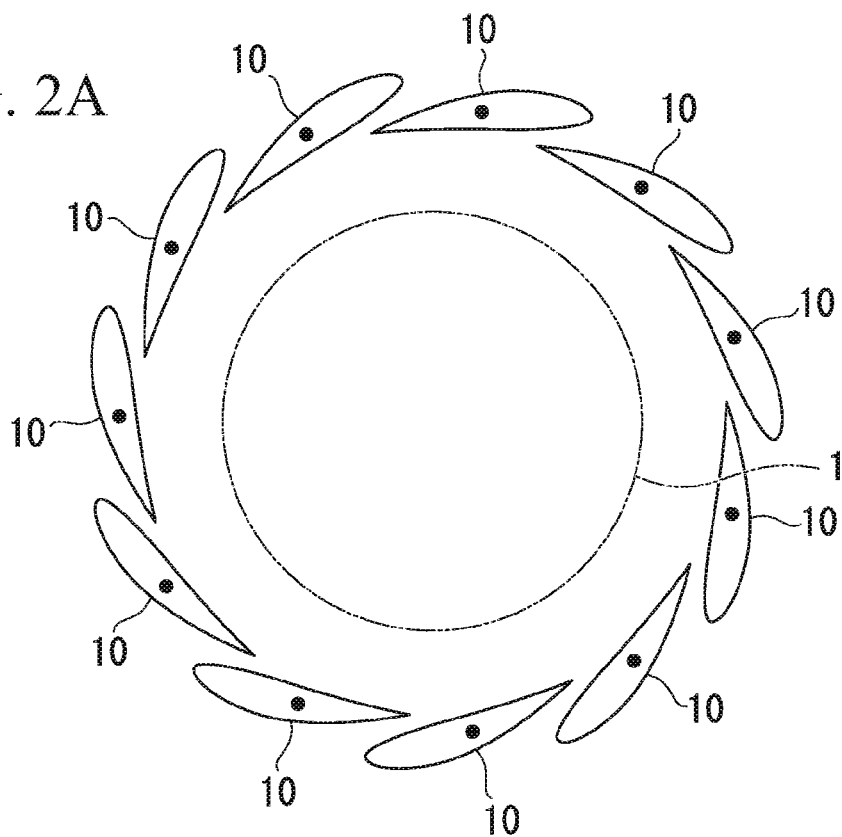
FIG. 2A is schematic view that shows the appearance of rotation of the nozzle blades in one embodiment of the present invention, and shows the state of the opening of the nozzle N being small.
Figure 2B:
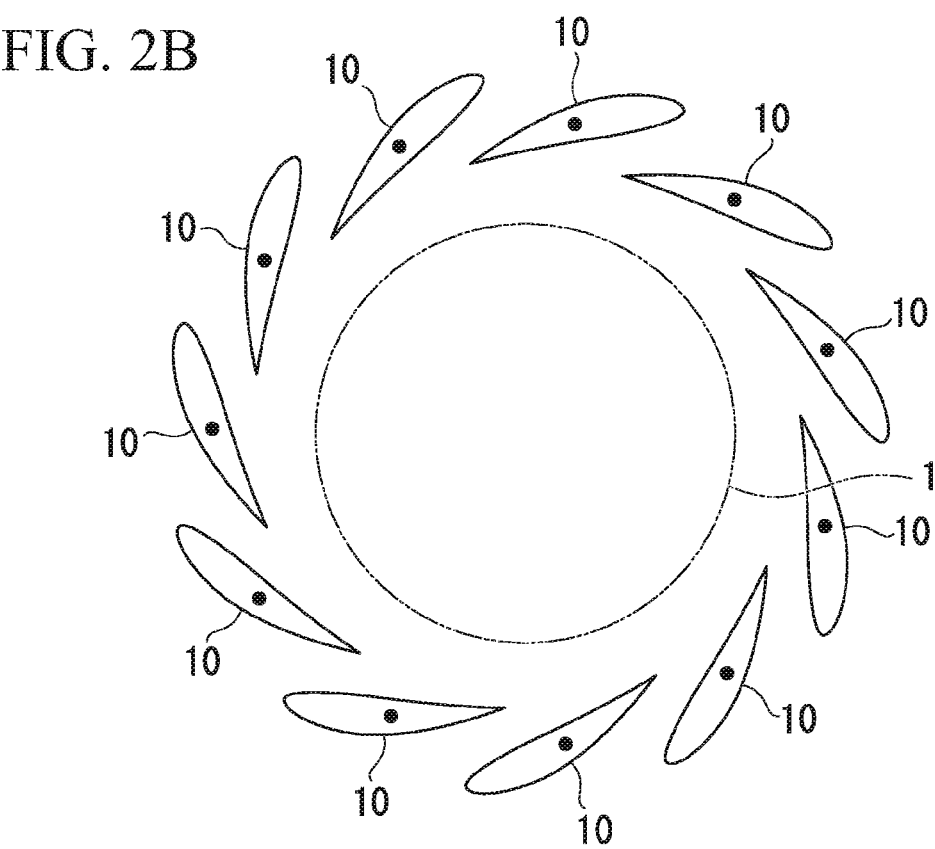
FIG. 2B is schematic view that shows the appearance of rotation of the nozzle blades in one embodiment of the present invention, and shows the state of the opening of the nozzle N being large.

The nozzle blade 10 of the present embodiment is disposed in a rotatable manner in the nozzle N as shown in FIG. 1, and a plurality are arranged annularly along the circumference of the turbine impeller 1 as shown in the schematic drawings of FIG. 2A and FIG. 2B.

Figure 3A:
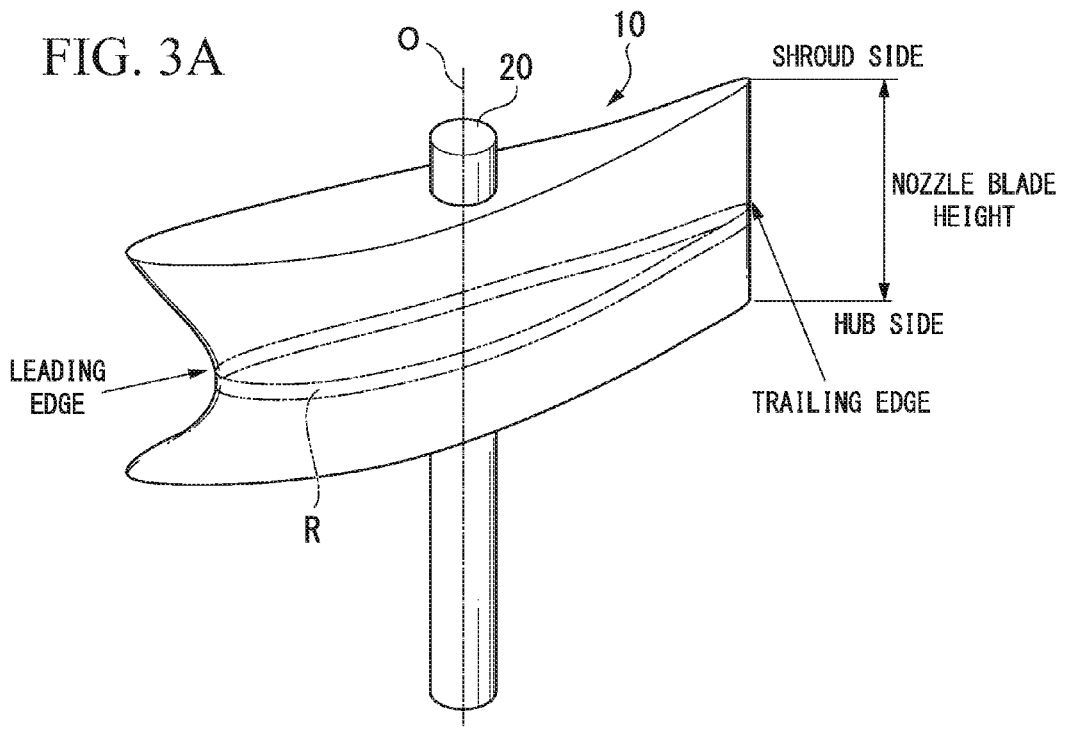
FIG. 3A is a schematic view of the nozzle blade in one embodiment of the present invention.

Note that as shown in FIG. 3A, a shaft portion 20 that takes the rotation axis O of the nozzle blade 10 as its central axis is connected to the nozzle blade 10 in the nozzle blade height direction.

As a result of all the shaft portions 20 being rotated in synchronization by a drive portion not illustrated, as shown in FIG. 2A and FIG. 2B, the nozzle blades 10 are rotated and the size of the gap between the nozzle blades 10 changes. Thereby, the opening of the nozzle N is adjusted.

Note that FIG. 2A shows the state of the opening of the nozzle N being small, while FIG. 2B shows the state of the opening of the nozzle N being large.

In the nozzle blade 10 of the present embodiment, as shown in FIG. 3A, the leading edge shape in the nozzle blade height direction has a curved-line shape that is formed by the distance from the rotation axis O of the nozzle blade to the leading edge changing depending on the nozzle blade height position.

Also, in the nozzle blade 10 of the present embodiment, the trailing edge shape in the nozzle blade height direction has a straight-line shape that is formed by the distance from the rotation axis O of the nozzle blade to the trailing edge being constant regardless of the nozzle blade height position.

Moreover, in the nozzle blade 10 of the present embodiment, as shown in FIG. 3A, a region (hereinbelow referred to as the shortest camber length region R) at which the length from the rotation axis O to the leading edge is shortest exists in a region sandwiched by both ends in the nozzle edge height direction (the hub-side end and the shroud-side end).

Moreover, the shortest camber length region R is disposed more to the hub side than the center in the nozzle blade height direction.

Hereinbelow, the effect of the nozzle blade 10 of the present embodiment shall be described, referring to the results of simulation and the like.

Figure 3B:
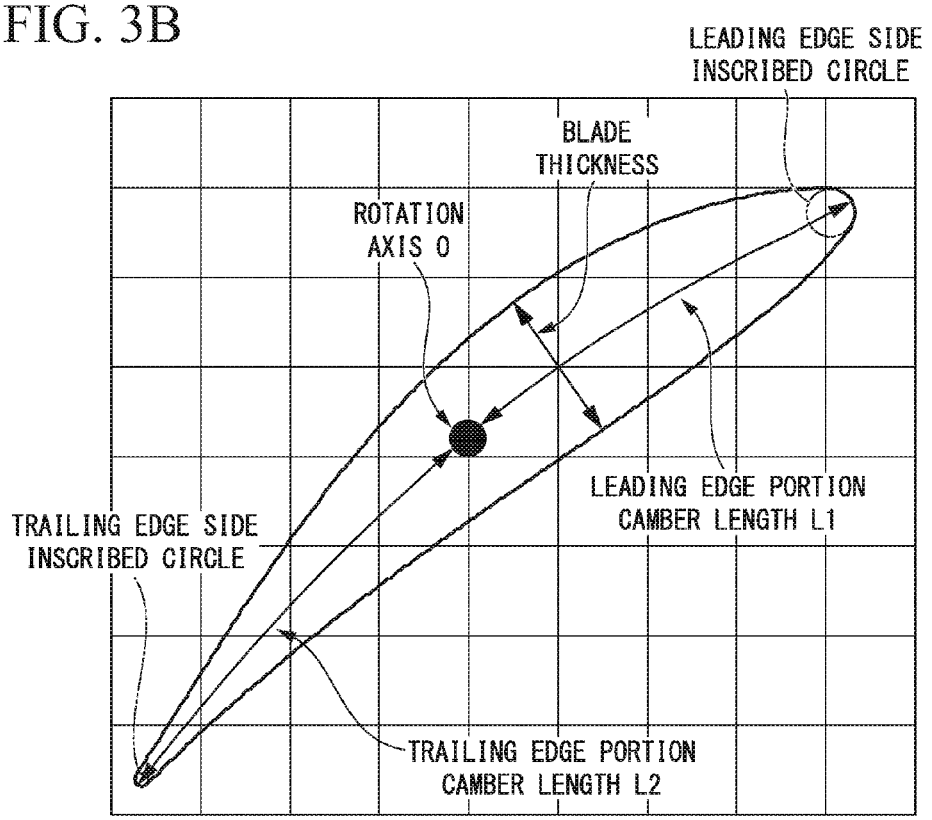
FIG. 3B is a schematic view of the nozzle blade in one embodiment of the present invention.
Figure 4:
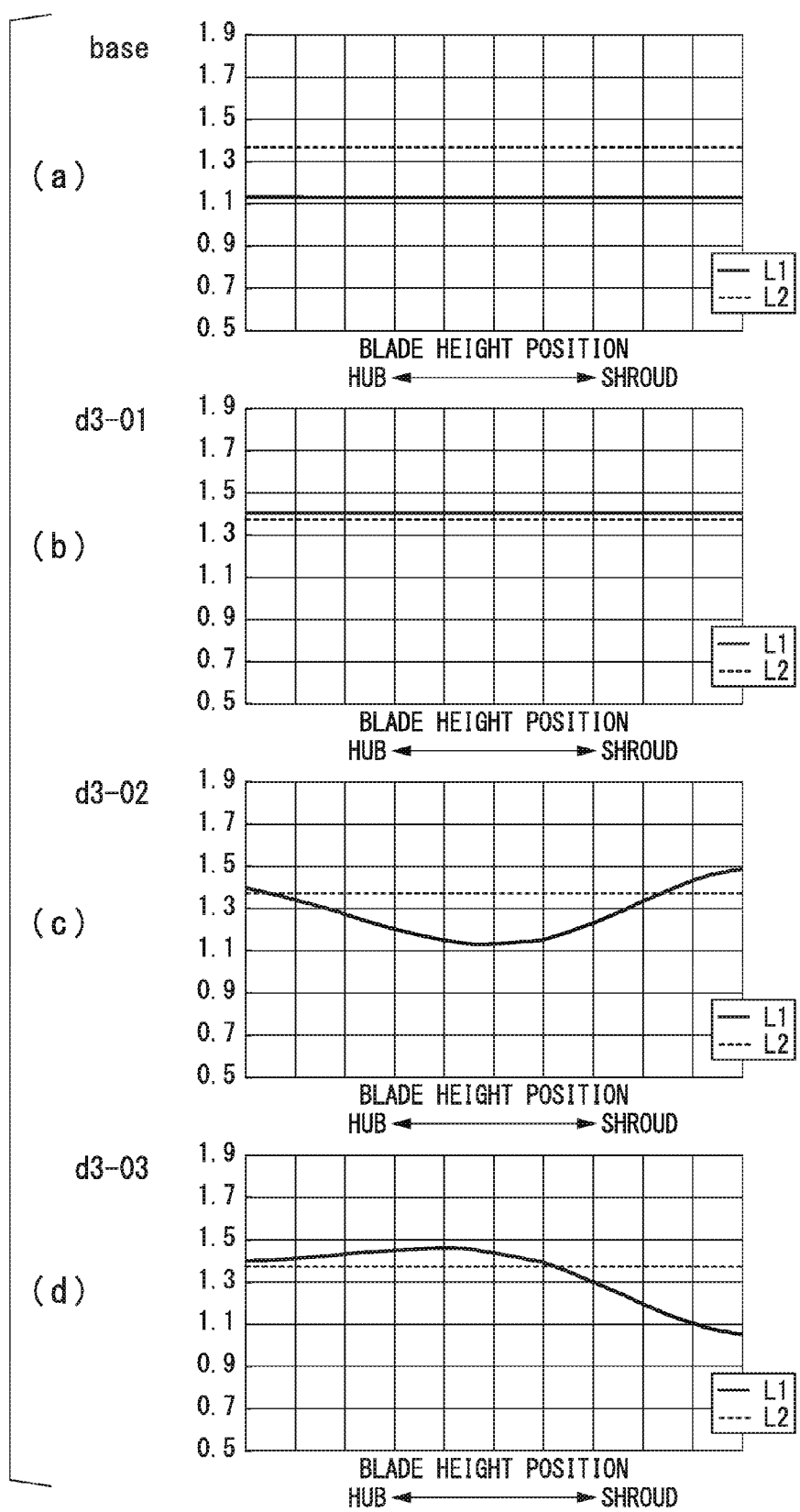
FIG. 4 is a graph that shows the shape of a nozzle blade used in the simulation for describing the effect of the nozzle blade in one embodiment of the present invention.
Figure 5:
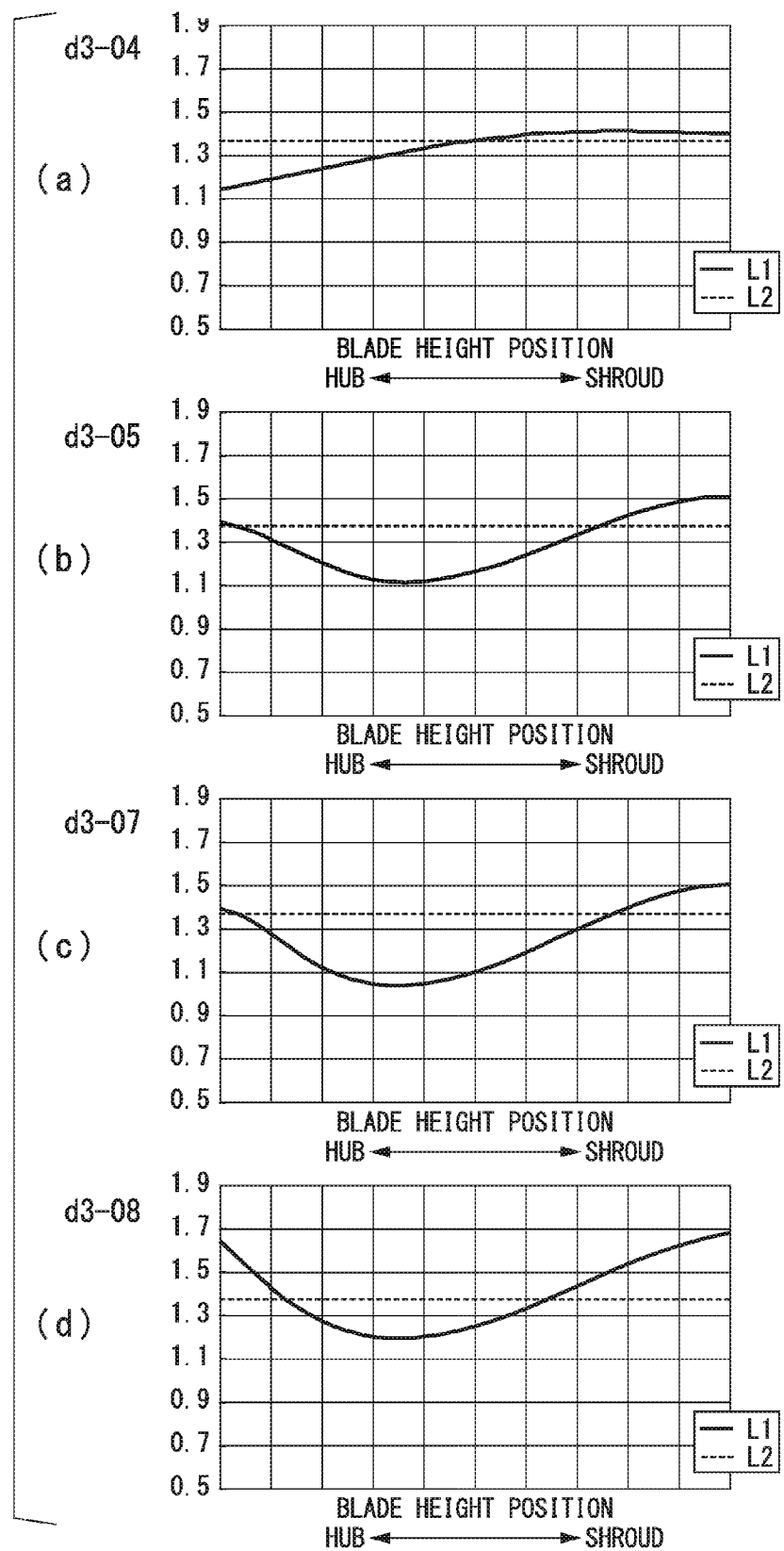
FIG. 5 is a graph that shows the shape of a nozzle blade used in the simulation for describing the effect of the nozzle blade in one embodiment of the present invention.

Note that in the following description, as shown in FIG. 3B, the distance from the rotation axis O to the leading edge is denoted as the leading edge camber length L1, and the distance from the rotation axis O to the trailing edge is denoted as the trailing edge portion camber length L2. Also, the thickness of the blade that is perpendicular with the camber line and the rotation axis O is denoted as the blade thickness, a hypothetical circle that touches the leading edge from the rotation axis O side is denoted as the leading edge side inscribed circle, and a hypothetical circle that touches the trailing edge from the rotation axis O side is denoted as the trailing edge side inscribed circle.

Regarding this simulation, the leading edge shape (that is to say, the change profile of the leading edge portion camber length L1 in the blade height direction) and the trailing edge shape (that is to say, the change profile of the trailing edge portion camber length L2 in the blade height direction) use the nozzle blades with the shapes shown in FIG. 4 to FIG. 7 [namely, base, and d3-01 to d3-15 (however, excluding d3-06).]

Note that as the length values used in the present simulation, normalized values with the blade thickness as a reference value are used. The longest camber length in the blade height direction of each nozzle blade (Max(L1+L2)), the shortest camber length in the blade height direction of each nozzle blade (Min(L1+L2)), and the average value of the camber length in the blade height direction of each nozzle blade (Average(L1+L2)) are set as shown in Table 1.

TABLE 1

| | Max (L1 + L2) | Min (L1 + L2) | Average (L1 + L2) |
|---|---|---|---|
| base | 2.500 | 2.500 | 2.500 |
| d3-01 | 2.777 | 2.777 | 2.777 |
| d3-02 | 2.864 | 2.508 | 2.716 |
| d3-03 | 2.828 | 2.422 | 2.591 |
| d3-04 | 2.789 | 2.519 | 2.755 |
| d3-05 | 2.889 | 2.492 | 2.694 |
| d3-07 | 2.882 | 2.416 | 2.651 |
| d3-08 | 3.063 | 2.572 | 2.817 |
| d3-09 | 3.131 | 2.372 | 2.724 |
| d3-10 | 2.816 | 2.317 | 2.565 |
| d3-11 | 2.882 | 2.416 | 2.651 |
| d3-12 | 2.858 | 2.128 | 2.508 |
| d3-13 | 2.875 | 2.323 | 2.604 |
| d3-14 | 2.871 | 2.276 | 2.580 |
| d3-15 | 2.878 | 2.361 | 2.623 |

In the present simulation, with the nozzle blade [base], in which the leading edge shape and the trailing edge shape are made to have a straight-line shape, serving as a reference, the torque ratio acting on each nozzle blade [d3-01 to d3-15 (but excluding d3-06)] and the turbine efficiency difference were investigated. The results are shown in Table 2 and FIG. 8. Note that with the torque ratio values of the present simulation, the cases of the torque acting in the direction in which a nozzle opening increases with respect to the nozzle blade are shown as positive, while the cases of the torque acting in the direction in which the nozzle opening decreases with respect to the nozzle blade are shown as negative.

TABLE 2

| Case Name | Torque Ratio | Efficiency Difference |
|---|---|---|
| d3-01 | −367.4% | 1.575 |
| d3-02 | −131.1% | 1.420 |
| d3-03 | −272.4% | 0.779 |
| d3-04 | −272.4% | 1.304 |
| d3-05 | −80.0% | 1.341 |
| d3-07 | 27.8% | 1.272 |
| d3-08 | −390.9% | 1.960 |
| d3-09 | −152.5% | 1.653 |
| d3-10 | −360.7% | −3.345 |
| d3-11 | −34.6% | 1.425 |
| d3-12 | 59.3% | 1.270 |
| d3-13 | 1.4% | 1.458 |
| d3-14 | 17.3% | 1.427 |
| d3-15 | −12.2% | 1.405 |

Based on the aforementioned simulation results, comparing the nozzle blade [d3-10] and the nozzle blades [d3-01 to d3-05, d3-07 to d3-09, and d3-11 to d3-15], it was found that the value of the turbine efficiency difference is extremely high for the nozzle blades [d3-01 to d3-05, d3-07 to d3-09, and d3-11 to d3-15]. That is to say, it was found that for the blades [d3-01 to d3-05, d3-07 to d3-09, and d3-11 to d3-15], the turbine efficiency is high with respect to the nozzle blade [d3-10].

Figure 6:
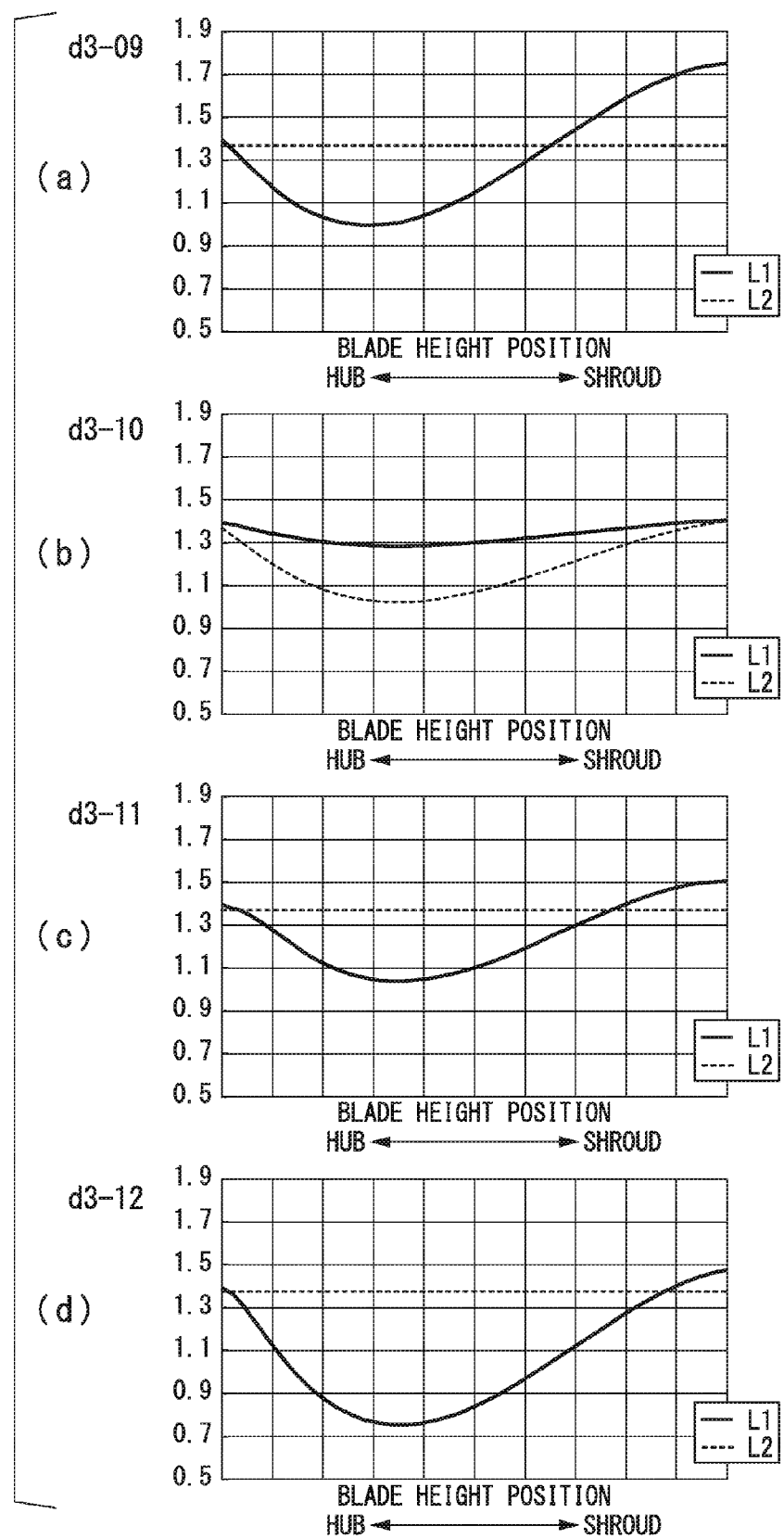
FIG. 6 is a graph that shows the shape of a nozzle blade used in the simulation for describing the effect of the nozzle blade in one embodiment of the present invention.
Figure 7:
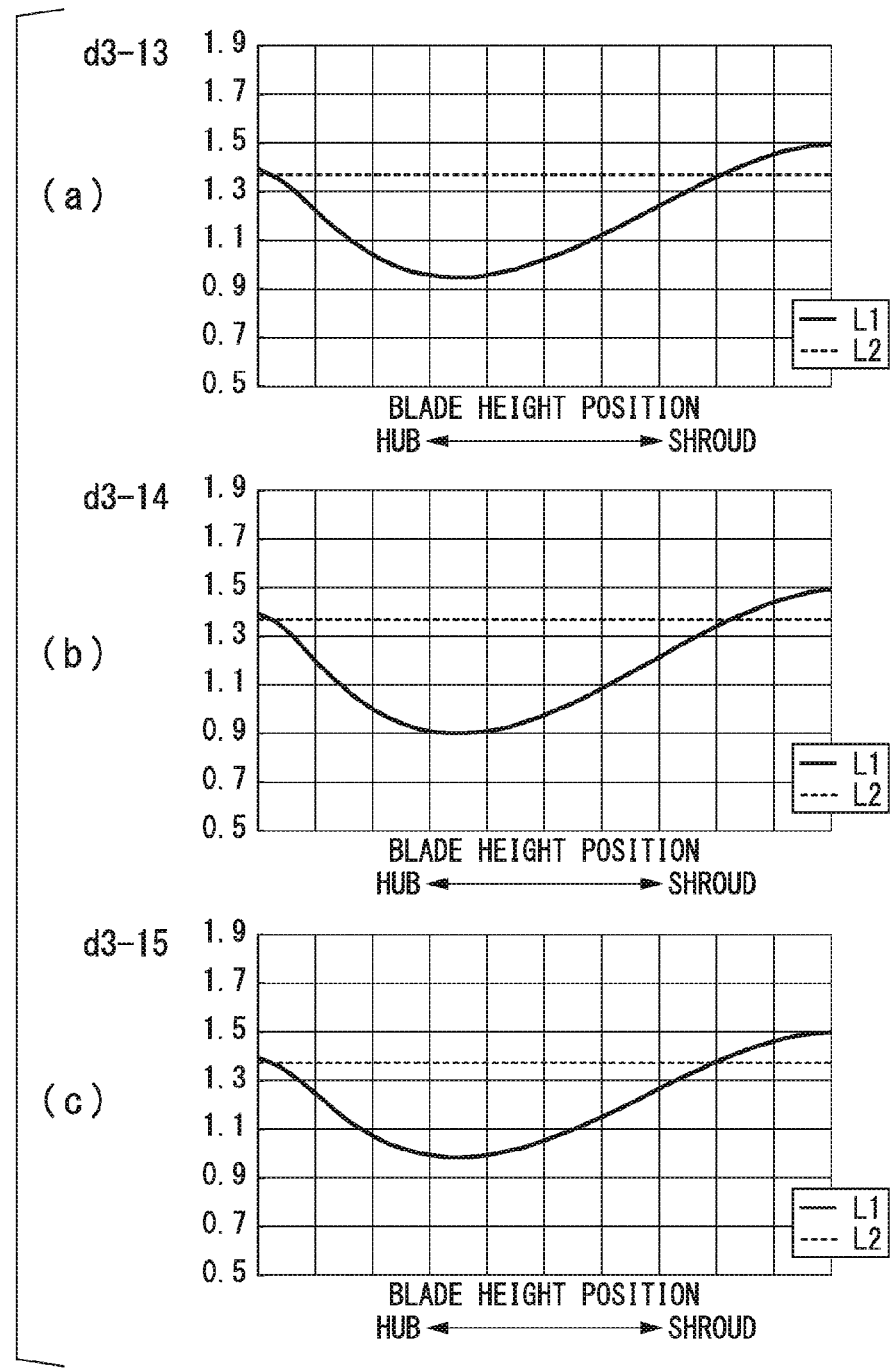
FIG. 7 is a graph that shows the shape of a nozzle blade used in the simulation for describing the effect of the nozzle blade in one embodiment of the present invention.

As shown in (b) of FIG. 6, in the nozzle blade [d3-10], both the leading edge shape and the trailing edge shape have a curved-line shape in which the central portion juts inward to the rotation axis O side. On the other hand, for the nozzle blades [d3-01 to d3-05, d3-07 to d3-09, and d3-11 to d3-15], as shown in (b) of FIG. 4 to (a) of FIG. 6 and (c) of FIG. 6 to (d) of FIG. 7, the leading edge shape is a curved-line shape, while the trailing edge shape has a straight-line shape.

That is to say, those nozzle blades in which only the leading edge shape is a curved-line shape and the trailing edge shape is a straight-line shape were found to have a higher turbine efficiency than those in which both the leading edge shape and the trailing edge shape are curved-line shapes.

As described above, in the nozzle blade 10 of the present embodiment, the trailing edge shape in the nozzle blade height direction has a straight-line shape that is formed by the distance from the rotation axis O of the nozzle blade to the trailing edge being constant regardless of the nozzle blade height position.

For this reason, the nozzle blade 10 of the present embodiment can improve the turbine efficiency more than the nozzle blade disclosed in Patent Document 1 in which the leading edge shape in the nozzle blade height direction and the trailing edge shape in the nozzle height direction both have curved-line shapes.

Figure 9:
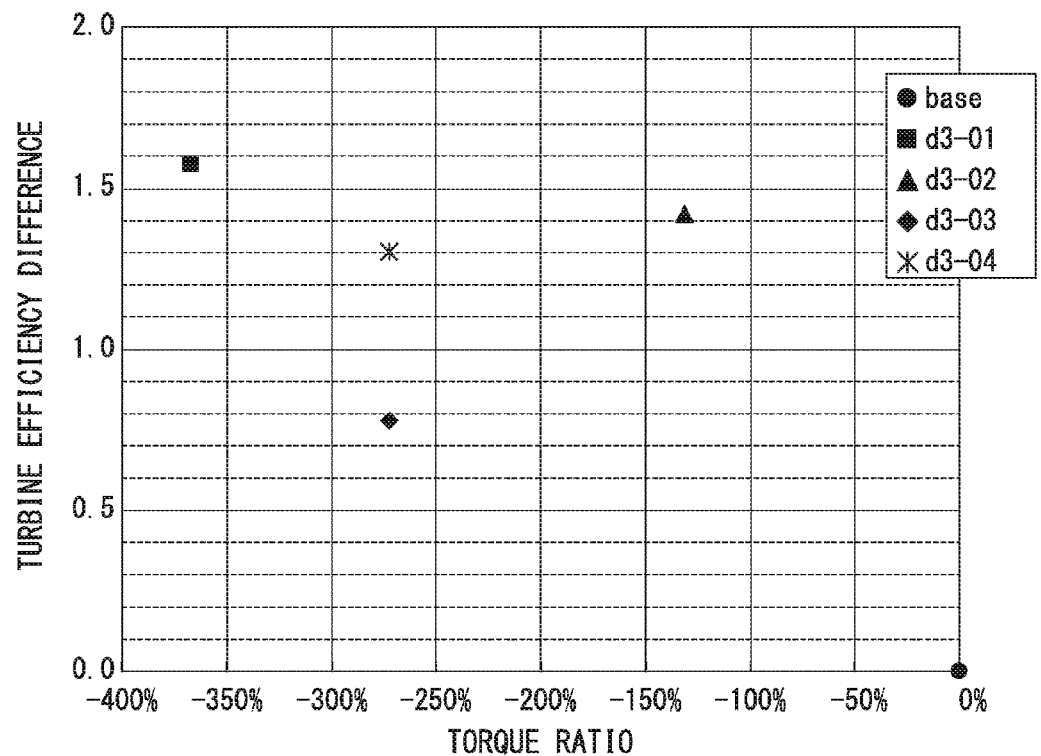
FIG. 9 is a graph that shows the result of a simulation for describing the effect of the nozzle blade in one embodiment of the present invention.

Also, as shown in Table 3 and FIG. 9, when comparing the nozzle blades [d3-01 to d3-04], the nozzle blade [d3-02] was found to have the highest performance from the advantage of the balance of the turbine efficiency difference and torque ratio being good.

TABLE 3

| | base | d3-01 | d3-02 | d3-03 | d3-04 |
|---|---|---|---|---|---|
| Fully opened capacity difference | 0.00% | 0.61% | 0.32% | 0.52% | 0.51% |
| Torque ratio | 0% | −367% | −131% | −272% | −272% |
| Turbine efficiency difference | 0.0 | 1.6 | 1.4 | 0.8 | 1.3 |

In the nozzle blade [d3-02], the shortest camber length region R exists in a region that is sandwiched by both ends in the nozzle blade height direction (namely, the hub-side end and the shroud-side end). That is to say, the nozzle blade [d3-02] has a shape in which both ends in the nozzle blade height direction have a longer camber length than the central portion.

In this way, from the aforementioned simulation, it was found that due to the shortest camber length region R existing in the region that is sandwiched by both ends in the nozzle blade height direction (namely, the hub-side end and the shroud-side end), it is possible to improve the turbine efficiency. Moreover, it was found that the nozzle blade can always receive the torque in the direction in which the nozzle opening increases.

In the nozzle blade 10 of the present embodiment, the shortest camber length region R exists in a region that is sandwiched by both ends (the hub-side end and the shroud-side end) in the nozzle blade height direction.

For this reason, it is always possible for the nozzle blade 10 of the present embodiment to receive the torque in the direction in which the nozzle opening increases.

Figure 10:
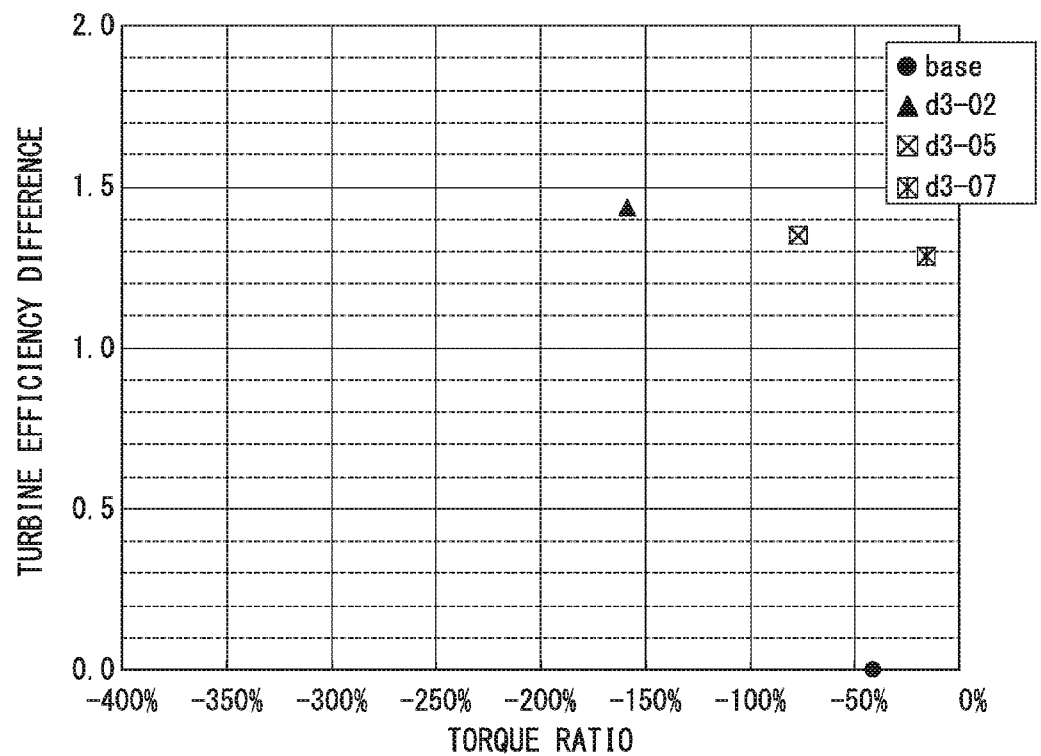
FIG. 10 is a graph that shows the result of a simulation for describing the effect of the nozzle blade in one embodiment of the present invention.

Also, as shown in Table 4 and FIG. 10, comparing the nozzle blades [d3-02, d3-05, and d3-07], the performance was found to increase in the order of nozzle blade [d3-02], nozzle blade [d3-05], and nozzle blade [d3-07] from the standpoint of the balance of turbine efficiency difference and torque ratio.

TABLE 4

| | base | d3-01 | d3-02 | d3-03 | d3-04 |
|---|---|---|---|---|---|
| Fully opened capacity difference | 0.00% | 0.61% | 0.32% | 0.52% | 0.51% |
| Torque ratio | 0% | −367% | −131% | −272% | −272% |

TABLE 4-continued

|  | base | d3-01 | d3-02 | d3-03 | d3-04 |
|---|---|---|---|---|---|
| Turbine efficiency difference | 0.0 | 1.6 | 1.4 | 0.8 | 1.3 |

In the nozzle blades [d3-02, d3-05, and d3-07], the shortest camber length region R exists in a region that is sandwiched by both ends (the hub-side end and the shroud-side end) in the nozzle blade height direction. However, the shortest camber length region R approaches the hub 3 side in the order of the nozzle blade [d3-02], the nozzle blade [d3-05], and the nozzle blade [d3-07].

Accordingly, from the aforementioned simulation, on the premise of the shortest camber length region R existing in a region that is sandwiched by both ends (the hub-side end and the shroud-side end) in the nozzle blade height direction, it was found that is possible to improve the turbine efficiency by the shortest camber length region R approaching the hub 3 side. Moreover, it was found that the nozzle blade can always receive the torque in the direction in which the nozzle opening increases.

The nozzle blade 10 of the present embodiment has a shape in which the shortest camber length region R exists in a region that is sandwiched by both ends (the hub-side end and the shroud-side end) in the nozzle blade height direction, and moreover in which the shortest camber length region R approaches the hub 3 side.

For this reason, according to the nozzle blade 10 of the present embodiment, it is possible to improve the turbine efficiency, and moreover it is always possible to receive the torque in the direction in which the nozzle opening increases.

Figure 8:
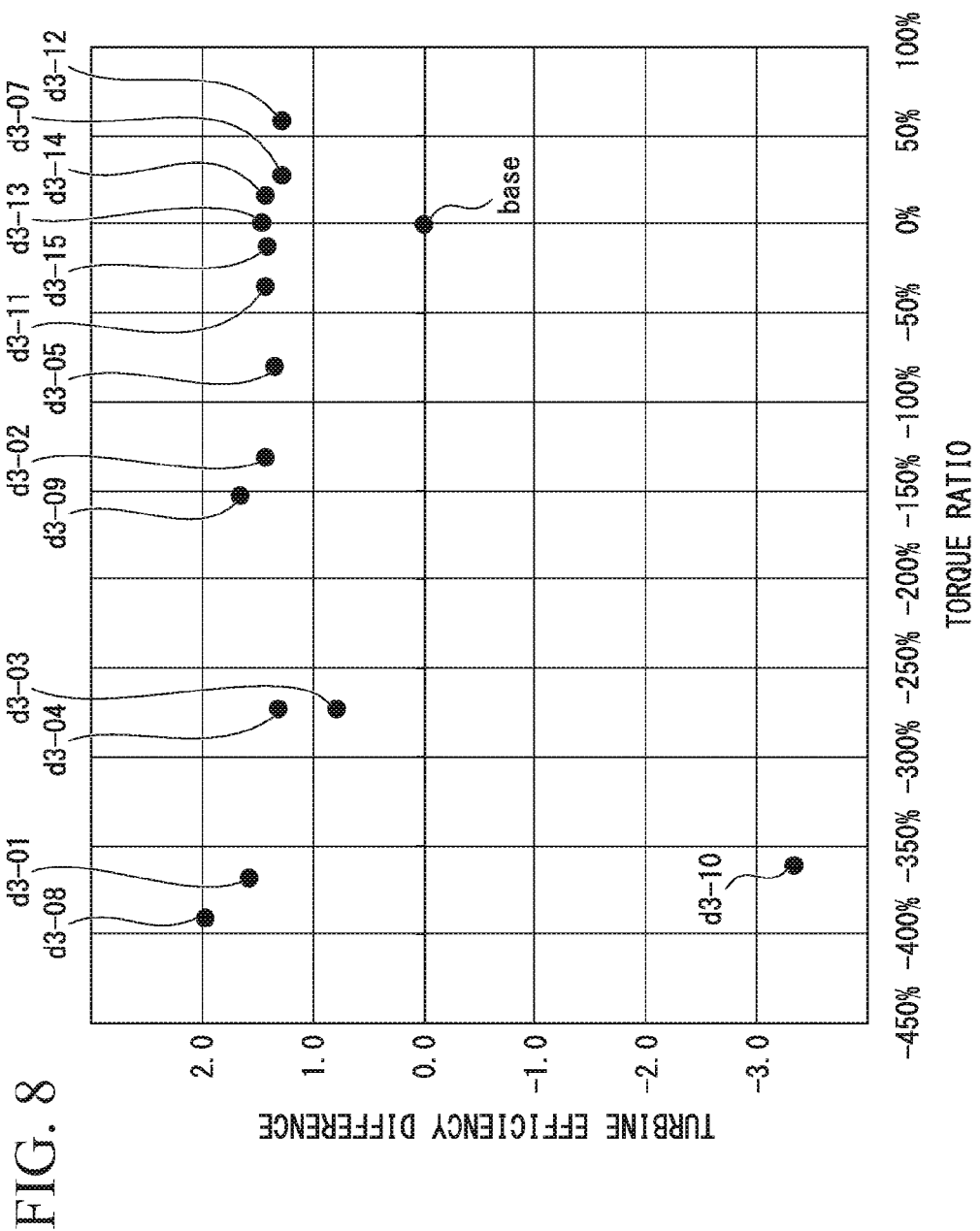
FIG. 8 is a graph that shows the result of a simulation for describing the effect of the nozzle blade in one embodiment of the present invention.

Referring to Table 2 and FIG. 8, comparing all of the nozzle blades [base, d3-01 to d3-15 (but excluding d3-06)], the performance of the nozzle blade [d3-12] was found to be high from the advantage of the balance of the turbine efficiency difference and torque ratio being good.

Figure 11:
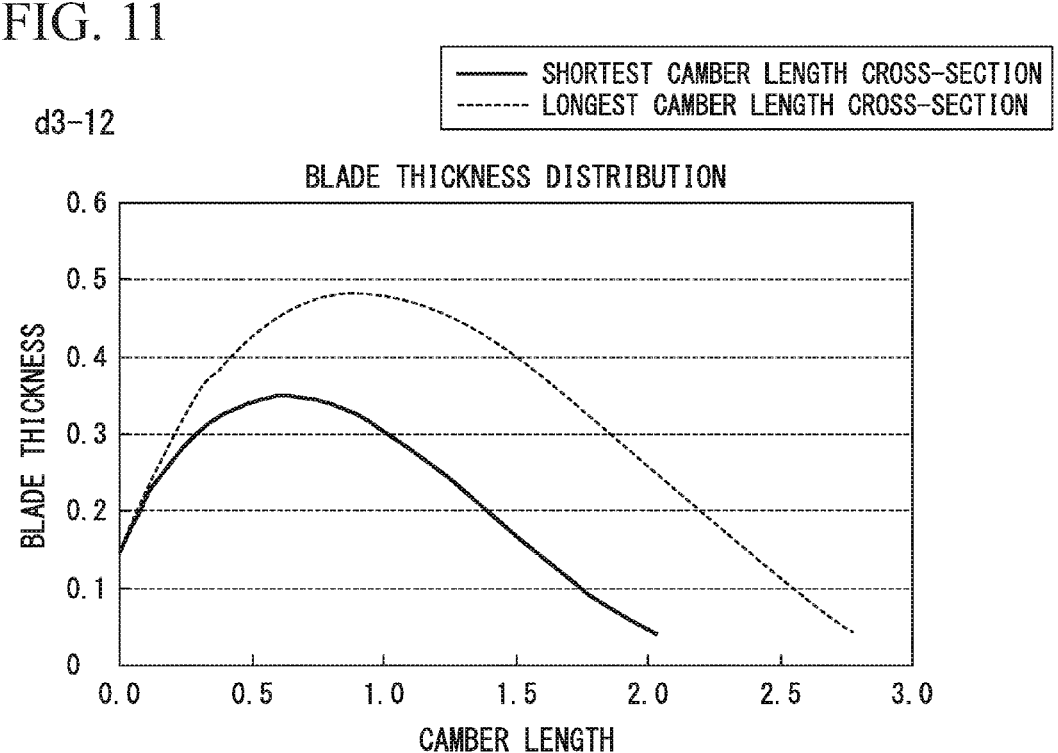
FIG. 11 is a graph showing the detailed shape of a nozzle blade that exhibits the highest performance in the simulation for describing the effect of the nozzle blade in one embodiment of the present invention.

FIG. 11 is a drawing that shows the shape of the nozzle blade [d3-12], and shows a graph that shows the relation of camber length and blade thickness by normalized values with the blade thickness serving as the reference value, and the leading edge inscribed circle diameter and the trailing edge inscribed circle diameter.

Note that in the nozzle blade [d3-12], similarly to the nozzle blade 10 of the present embodiment, the trailing edge shape in the nozzle blade height direction has a straight-line shape that is formed by the distance from the rotation axis O of the nozzle blade to the trailing edge being constant regardless of the nozzle blade height position.

Also, in the nozzle blade [d3-12], similarly to the nozzle blade 10 of the present embodiment, the shortest camber length region R exists in a region that is sandwiched by both ends (the hub-side end and the shroud-side end) in the nozzle blade height direction. The shortest camber length region R is disposed more to the hub side than the center in the nozzle blade height direction.

Moreover, in the nozzle blade [d3-12], as shown in Table 1 and FIG. 11, the normalized values having the nozzle blade height as a reference value are set so that the length from the leading edge to the trailing edge is 2.128 in the region in the nozzle blade height direction where the length from the leading edge to the trailing edge is shortest, the length from the leading edge to the trailing edge is 2.858 in the region in the nozzle blade height direction where the length from the leading edge to the trailing edge is longest, and the average value of the length from the leading edge to the trailing edge is 2.508 in the nozzle blade height direction. Also, the normalized values having the nozzle blade height as a reference value are set so that the leading edge inscribed circle diameter at the region in the nozzle blade height direction in which the length from the leading edge to the trailing edge is shortest is 0.146, the leading edge inscribed circle diameter at the region in the nozzle blade height direction in which the length from the leading edge to the trailing edge is longest is 0.142, the trailing edge inscribed circle diameter at the region in the nozzle blade height direction in which the length from the leading edge to the trailing edge is shortest is 0.04, and the trailing edge inscribed circle diameter at the region in the nozzle blade height direction in which the length from the leading edge to the trailing edge is longest is 0.04.

That is to say, by setting the shape of the nozzle blade 10 of the present embodiment based on the normalized values described above, it is capable of further improving the turbine efficiency, and moreover it is always capable of receiving a large torque in the direction in which the nozzle opening becomes large.

Note that without being limited to the shape of the nozzle blade [d3-12], the normalized values having the nozzle blade height as a reference value are set so that the length from the leading edge to the trailing edge in the region in the nozzle blade height direction where the length from the leading edge to the trailing edge is shortest is in the range of 2.0 to 2.2, the length from the leading edge to the trailing edge in the region in the nozzle blade height direction where the length from the leading edge to the trailing edge is longest is in the range of 2.7 to 2.9, and the average value of the length from the leading edge to the trailing edge in the nozzle blade height direction is in the range of 2.4 to 2.6. Also, the normalized values having the nozzle blade height as a reference value are set so that the leading edge inscribed circle diameter at the region in the nozzle blade height direction in which the length from the leading edge to the trailing edge is shortest is in the range of 0.1 to 0.2, the leading edge inscribed circle diameter at the region in the nozzle blade height direction in which the length from the leading edge to the trailing edge is longest is in the range of 0.1 to 0.2, the trailing edge inscribed circle diameter at the region in the nozzle blade height direction in which the length from the leading edge to the trailing edge is shortest is in the range of 0.01 to 0.1, and the trailing edge inscribed circle diameter at the region in the nozzle blade height direction in which the length from the leading edge to the trailing edge is longest is in the range of 0.01 to 0.1. Thereby, it is possible to further improve the turbine efficiency, and moreover it is always possible to receive large torque in the direction in which the nozzle opening becomes large.

Hereinabove, the preferred embodiment of the present invention was described while referring to the appended drawings, but the present invention is not limited to the aforementioned embodiment.

The various shapes and combinations of each composite member shown in the embodiment described above refer to only a single example, and may be altered in various ways based on design requirements and so forth within a scope that does not deviate from the subject matter of the present invention.

For example, the number of the nozzle blades 10 that are arranged around the turbine impeller 1 shown in FIG. 2A and FIG. 2B is one example, and may be fewer or may be more than the number shown in FIG. 2A and FIG. 2B.

Also, it is not necessary for all of the nozzle blades that are disposed around the turbine impeller 1 to be the nozzle blade 10 of the embodiment described above.

INDUSTRIAL APPLICABILITY

According to the nozzle blade of the present invention, it is possible to provide a nozzle blade that can improve the turbine efficiency, and that can always receive the torque in the direction in which the nozzle opening becomes large.

DESCRIPTION OF THE REFERENCE SYMBOLS

10 nozzle blade, 1 turbine impeller, 2 shroud, 3 hub (opposing wall), N nozzle

The invention claimed is:

1. A variable-capacity turbocharger comprising:
a turbine impeller which includes turbine blades;
a plurality of nozzle blades, each rotatable around a respective shaft portion of each of the nozzle blades, disposed at the periphery of the turbine impeller;
a shroud surrounding a tip side of the turbine blades;
an opposing wall that is separated from the shroud in a height direction of the nozzle blades; and
a nozzle sandwiched by the shroud and the opposing wall, the nozzle being provided with the nozzle blades, wherein
a leading edge of the nozzle blades in the height direction of the nozzle blades has a curved-line shape over the entire length of the leading edge relative to a distance from the shaft portion of the nozzle blades to the leading edge which changes depending on a height position of the nozzle blades, and
a trailing edge of the nozzle blades in the height direction of the nozzle blades has a straight-line shape such that a distance from the shaft portion of the nozzle blades to the trailing edge being constant irrespective of the height position of the nozzle blades.

2. The turbocharger according to claim 1, wherein a region at which the distance from the shaft portion to the leading edge is shortest is sandwiched by both ends in the height direction of the nozzle blades.

3. The turbocharger according to claim 2, wherein the region is closer to the opposing wall than to a center of the nozzle blades in the height direction of the nozzle blades.

* * * * *